United States Patent
Perets et al.

(10) Patent No.: US 8,385,441 B2
(45) Date of Patent: Feb. 26, 2013

(54) EFFICIENT MIMO TRANSMISSION SCHEMES

(75) Inventors: Yona Perets, Ra'anana (IL); Krishna Srikanth Gomadam, Sunnyvale, CA (US); Adoram Erell, Herzliya (IL); Daniel Yellin, Ra'anana (IL); Ezer Melzer, Tel Aviv (IL)

(73) Assignee: Marvell World Trade Ltd., St. Michael (BB)

( * ) Notice: Subject to any disclaimer, the term of this patent is extended or adjusted under 35 U.S.C. 154(b) by 910 days.

(21) Appl. No.: 12/477,152

(22) Filed: Jun. 3, 2009

(65) Prior Publication Data

US 2010/0172424 A1 Jul. 8, 2010

Related U.S. Application Data

(60) Provisional application No. 61/142,735, filed on Jan. 6, 2009, provisional application No. 61/175,197, filed on May 4, 2009.

(51) Int. Cl.
 *H04L 27/28* (2006.01)
(52) U.S. Cl. ........ 375/260; 375/295; 375/259; 375/267; 375/285; 375/299
(58) Field of Classification Search ................ 375/260, 375/295, 259, 267, 285, 299
See application file for complete search history.

(56) References Cited

U.S. PATENT DOCUMENTS

| | | | |
|---|---|---|---|
| 5,231,629 A | 7/1993 | Kotzin et al. | |
| 5,940,439 A | 8/1999 | Kleider et al. | |
| 6,512,750 B1 | 1/2003 | Palenius | |
| 6,757,319 B1 | 6/2004 | Parsa et al. | |
| 6,865,237 B1 | 3/2005 | Boariu et al. | |
| 7,839,944 B2 | 11/2010 | Lee et al. | |
| 8,036,286 B2 | 10/2011 | Lee et al. | |
| 8,068,555 B2 | 11/2011 | Jongren et al. | |
| 8,098,750 B2 | 1/2012 | Mueck et al. | |
| 8,179,775 B2 | 5/2012 | Chen et al. | |
| 2003/0035491 A1 | 2/2003 | Walton et al. | |
| 2005/0141630 A1 | 6/2005 | Catreux et al. | |
| 2005/0157810 A1 | 7/2005 | Raleigh et al. | |
| 2005/0237920 A1 | 10/2005 | Howard et al. | |
| 2005/0250544 A1 | 11/2005 | Grant et al. | |
| 2006/0014554 A1 | 1/2006 | Gerlach | |
| 2006/0056538 A1 | 3/2006 | Nam et al. | |

(Continued)

FOREIGN PATENT DOCUMENTS

WO 2007133564 A3 11/2007
WO 2008009157 A1 1/2008

OTHER PUBLICATIONS

3GPP TSG RAN WG1 Meeting #55, by LG Electronics, Title Consideration on DL-MIMO in LTE-Advanced, dated Nov. 11-14, 2008.*

(Continued)

*Primary Examiner* — Siu Lee

(57) ABSTRACT

A method for communication includes, in a transmitter having a first number of transmit antenna ports, setting an upper limit on a second number of spatial layers to be used by the transmitter to be less than the first number. An actual number of the spatial layers, which does not exceed the upper limit, is allocated for transmission to a given receiver. One or more streams of modulated symbols are mapped onto the allocated actual number of the spatial layers. The actual number of the spatial layers are transmitted from the transmitter to the given receiver. A precoding operation maps the spatial layers onto the transmit antenna ports. A first upper limit is set when the precoding operation depends on feedback from the given receiver. A second upper limit, which does not exceed the first upper limit, is set when the precoding operation is not dependent on the feedback.

33 Claims, 10 Drawing Sheets

U.S. PATENT DOCUMENTS

| | | |
|---|---|---|
| 2006/0093060 A1 | 5/2006 | Jung et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0149229 A1 | 6/2007 | Frederiksen et al. |
| 2007/0160162 A1* | 7/2007 | Kim et al. .................. 375/267 |
| 2007/0165738 A1 | 7/2007 | Barriac et al. |
| 2007/0223422 A1 | 9/2007 | Kim et al. |
| 2007/0230373 A1 | 10/2007 | Li et al. |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0039067 A1 | 2/2008 | Jin et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080637 A1 | 4/2008 | Khan et al. |
| 2008/0095258 A1 | 4/2008 | She et al. |
| 2008/0101407 A1* | 5/2008 | Khan et al. .................. 370/468 |
| 2008/0108310 A1 | 5/2008 | Tong et al. |
| 2008/0130778 A1 | 6/2008 | Xia et al. |
| 2008/0192856 A1* | 8/2008 | Jongren et al. .............. 375/267 |
| 2008/0232494 A1 | 9/2008 | Pan et al. |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0292013 A1* | 11/2008 | Varadarajan et al. ......... 375/260 |
| 2008/0298452 A1* | 12/2008 | Sampath et al. .............. 375/232 |
| 2008/0298482 A1 | 12/2008 | Rensburg et al. |
| 2008/0318606 A1 | 12/2008 | Tsutsui et al. |
| 2009/0016263 A1 | 1/2009 | Kishigami et al. |
| 2009/0046800 A1 | 2/2009 | Xu et al. |
| 2009/0122857 A1 | 5/2009 | Li et al. |
| 2009/0180561 A1 | 7/2009 | Kim et al. |
| 2009/0296844 A1 | 12/2009 | Ihm et al. |
| 2010/0035627 A1 | 2/2010 | Hou et al. |
| 2010/0054354 A1 | 3/2010 | Tosato |
| 2010/0061477 A1 | 3/2010 | Lee et al. |
| 2010/0103834 A1 | 4/2010 | Gorokhov et al. |
| 2010/0172430 A1 | 7/2010 | Melzer et al. |
| 2010/0173639 A1 | 7/2010 | Li et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0267341 A1 | 10/2010 | Bergel et al. |
| 2010/0284484 A1* | 11/2010 | Jongren et al. .............. 375/267 |
| 2010/0290548 A1 | 11/2010 | Hoshino et al. |
| 2011/0019631 A1 | 1/2011 | Kotecha et al. |
| 2011/0058621 A1 | 3/2011 | Clerckx et al. |
| 2012/0087425 A1 | 4/2012 | Gomadam et al. |
| 2012/0087435 A1 | 4/2012 | Gomadam et al. |

OTHER PUBLICATIONS

Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Li et al., U.S. Appl. No. 61/167,066 "CQI and PMI/PVI Feedback Strategies for Multiuser MIMO System" filed Apr. 6, 2009.
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
3GPP Technical Specification 36.211 "Technical Specification Group Radio Access Network; Evolved Universal Terrestrial Radio Access (E-UTRA); Physical Channels and Modulation (Release 8)," version 8.6.0, Sophia Antipolis, France, Mar. 2009.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
International Application PCT/IB2009/052726 Search Report dated Jan. 28, 2010.
Ericsson, "Carrier Aggregation in LTE-Advanced", TSG-RAN WG1 #53bis, Warsaw, Poland, Jun. 30-Jul. 4, 2008.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
NTT Docomo et al., "Prioritized Deployment Scenarios for LTE-Advanced Studies", 3GPP TSG RAN WG4 Meeting #50, Athens, Greece, Feb. 9-13, 2009 (R4-091011).
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TS RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Samsung, "UL Transmission Power Control in LTE-A", 3GPP TSG RAN WG1 Meeting #56bis, Seoul, Korea, Mar. 23-27, 2009 (R1-091250).
Qualcomm Europe, Notion of Anchor Carrier in LTE-A, 3GPP TSG RAN WG1 Meeting #55-bis, Ljubljana, Slovenia, Jan. 12-16, 2009 (R1-080356).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).
Motorola, "Interference Mitigation via Power Control and FDM Resource Allocation and UE Alignment for E-UTRA Uplink and TP", 3GPP TSG RAN1 # 44, Denver, USA, Feb. 13-17, 2006.

Rapporteur (NTT Docomo), "Text Proposal for RAN1 TR on LTE Advanced", 3GPP TSG RAN WG1 Meeting #53bis, Warsaw, Poland, Jun. 30-Jul. 4, 2008.

International Application PCT/IB2009/052987 Search Report dated Jan. 27, 2010.

Alcatel-Lucent, "Fractional Power Control Using Pilot Power Ration Measurements for the E-UTRA Uplink", 3GPP TSG RAN WG1 # 48, St Louis, USA, Feb. 12-16, 2007.

3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.

Motorola, "Uplink Power Control for E-UTRA", 3GPP TSG RAN1 #48, St. Louis, USA, Feb. 12-16, 2007.

Nortel, "On the discussions of carrier aggregations", 3GPP TSG-RAN Working Group 1 Meeting #55, Prague, Czech Republic, Nov. 10-14, 2008.

NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.

3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.

Lucent Technologies, "Link Error Prediction for E-DCH", TSG-RAN WG1#35, Lisbon, Portugal, Nov. 17-21, 2003.

Samsung, "Codebook Design for 8 Tx Transmission in LTE-A", 3GPP TSG RAN WG1 Meeting #56, Athens, Greece, Feb. 9-13, 2009.

Ericsson, "System-level evaluation of OFDM—further considerations", TSG-RAN WG1 #35, Lisbon, Portugal, Nov. 17-21, 2003.

Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.

Park et al., "Efficient Coherent Neighbour Cell Search for Synchronous 3GPP LTE System", Electronic Letters, vol. 44, No. 21, Oct. 2008.

Marvell Semiconductor, "Precoding Options for 8Tx Antennas in LTE-A DL", 3GPP TSG RAN WG1 Meeting #55bis, Ljubljana, Slovenia, Jan. 12-16, 2009.

Samsung, "Discussion on Enhanced DL Beamforming", 3GPP TSG RAN WG1 Meeting #56bis, Seoul, Korea, Mar. 23-27, 2009.

3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.

International Application PCT/IB2010/053272 Search report dated Dec. 27, 2010.

International Application PCT/IB2010/051088 Search Report dated Sep. 21, 2010.

U.S. Appl. No. 12/902,168, filed Oct. 12, 2010.
U.S. Appl. No. 12/965,878, filed Dec. 12, 2010.
U.S. Appl. No. 12/838,509, filed Jul. 19, 2010.
U.S. Appl. No. 12/903,237, filed Oct. 13, 2010.
U.S. Appl. No. 13/023,555, filed Feb. 9, 2011.
U.S. Appl. No. 13/052,075, filed Mar. 20, 2011.
U.S. Appl. No. 61/321,386, filed Apr. 6, 2010.
U.S. Appl. No. 61/294,737, filed Mar. 13, 2010.
U.S. Appl. No. 12/983,898, filed Jan. 4, 2011.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.

Alcatel-Lucent et al., "Way Forward on Enhancement for REL.10 DL MIMO", 3GPP TSG RAN # 62 Meeting, Madrid, Spain, Aug. 23-27, 2010.

Alcatel-Lucent, "Further Analysis of Companion Feedback Performance and Feedback Signaling Overhead Reduction", 3GPP TSG RAN # 62 Meeting, Madrid, Spain, Aug. 23-27, 2010.

Alcatel-Lucent et al., "Way Forward on CQI/PMI Reporting Enhancement on PUSCH 3-1 for 2,4 and 8TX", 3GPP TSG RAN # 62BIS, Xian, China, Oct. 11-15, 2010.

Marvell, "CQI Enhancement for 4Tx", 3GPP TSG RAN # 62BIS, Xian, China, Oct. 11-15, 2010.

NEC Group, "Enhancing MU-MIMO CQI", 3GPP TSG RAN # 62BIS, Xian, China, Oct. 11-15, 2010.

LG Electronics, "Further Discussion on CQI/PMI Enhancement", 3GPP TSG RAN # 62BIS, Xian, China, Oct. 11-15, 2010.

Samsung, "Coordinated Multi-Point Operation for LTE", Istanbul, Turkey, Dec. 7-10, 2010.

Alcatel-Lucent et al., "Way Forward on CSI Feedback for Rel.10 DL MIMO", 3GPP TSG RAN # 62 Meeting, Madrid, Spain, Aug. 23-27, 2010.

Marvell, "Two-Component PMI Codebook for 8TX", 3GPP TSG RAN # 62 Meeting, Madrid, Spain, Aug. 23-27, 2010.

Marvell, "Details of PUCCH 1-1 for 8Tx", 3GPP TSG RAN # 63, Jacksonville, USA, Nov. 15-19, 2010.

Samsung, "Preliminary CoMP JP Results for Homogeneous Networks", 3GPP TSG RAN # 64, Taipei, Taiwan, Feb. 21-25, 2011.

Huawei, "Performance Evaluation of Phase 1: Downlink Homogeneous Network with High Tx Power RRHs", 3GPP TSG RAN # 64, Taipei, Taiwan, Feb. 21-25, 2011.

ZTE, "Initial CoMP Evaluation for Homogeneous Network with High Tx Power RRHs", 3GPP TSG RAN # 64, Taipei, Taiwan, Feb. 21-25, 2011.

U.S. Appl. No. 13/346,737, filed Jan. 10, 2012.
U.S. Appl. No. 13/433,293, filed Mar. 29, 2012.

Lee W. Young; Written Opinion of the International Searching Authority; Patent Cooperation Treaty; Jan. 28, 2010; International application No. PCT/IB 09/52726.

Lee W. Young; Written Opinion of the international Searching Authority; Patent Cooperation Treaty; Jul. 15, 2010; International application No. PCT/IB 10/50797.

Lee W. Young; Written Opinion of the International Searching Authority; Patent Cooperation Treaty; Jun. 15, 2010; International application No. PCT/IB 10/50014.

Lee W. Young; Written Opinion of the International Searching Authority; Patent Cooperation Treaty; Jul. 9, 2010; International application No. PCT/IB 10/51089.

3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.

3rd Generation Partnership Project; Technical Specification Group Radio Access Network; Evolved Universal Terrestrial Radio Access (E-UTRA); Physical Layer Procedures (Release 8), 3GPP TS 36.213 V8.6.0 (Mar. 2009), Sophia Antipolis, France.

3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.

LG Electronics, "Consideration of DL-MIMO in LTE-Advanced", 3GPP TSG RAN WG1 Meeting #55, Prague, Czech Republic, Nov. 10-14, 2008.

Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.

"RAN1 Chairman Notes", 3GPP TSG RAN WG1 Meeting #55bis, Ljubljana, Slovenia, Jan. 12-16, 2009.

3rd Generation Partnership Project; Technical Specification Group Radio Access Network; Evolved Universal Terrestrial Radio Access (E-UTRA); Physical Channels and Modulation (Release 8), Draft 3GPP TS 36.211 V8.6.0 (year 2009), Sophia Antipolis, France.

Qualcomm Europe, "Downlink RS Structure in Support of Higher-Order MIMO", 3GPP TSG RAN WG1 Meeting #57, San Francisco, USA, May 4-8, 2009.

China Mobile et al., "Framework for LTE PDSCH DRS Demodulation Requirements", 3GPP TSG RAN WG4 Meeting #49, Prague, Czech Republic, Nov. 10-14, 2008.

Hanzo et al., "OFDM and MCCDMA for Broadband Multi-User Communications, WLANs and Broadcasting", Wiley-IEEE Press, chapter 14, pp. 485-548, Sep. 19, 2003.

IEEE Standard 802.16 for Local and metropolitan area networks, "Part 16: Air Interface for Fixed Broadband Wireless Access Systems", Revision of IEEE Standard 802.16—2001, IEEE Computer Society and IEE Microwave Theory and Techniques Society, USA, Oct. 1, 2004.

International Application PCT/IB2010/055763 Search Report dated Jun. 14, 2011.

International Application PCT/IB2011/050015 Search Report dated Jul. 5, 2011.

Marvell, "Downlink MIMO with Coordinated Beamforming and Scheduling", 3GPP TSG RAN WG1 59, Jeju, South Korea, Nov. 9-14, 2009.

Texas Instruments, "Views and Simulation Results on 4Tx Codebook Enhancement", 3GPP TSG RAN WG1 62, Madrid, Spain, Aug. 23-27, 2010.

Texas Instruments, "Higher CSI feedback accuracy for 4/8Tx Rel.10 DL MIMO", 3GPP TSG RAN WG1 62, Madrid, Spain, Aug. 23-27, 2010.

Ericsson, "Design and Evaluation of Precoder Codebooks for CSI Feedback", 3GPP TSG RAN WG1 61bis, Dresden, Germany, Jun. 28-Jul. 2, 2010.

Rapporteur, "Coordinated Multi-Point Operation for LTE", TSG RAN WG1 50, Istanbul, Turkey, Dec. 7-10, 2010.

Alcatel-Lucent et al., "Way Forward on CSI Feedback for Rel.10 DL MIMO", 3GPP TSG RAN WG1 62, Madrid, Spain, Aug. 23-27, 2010.

Alcatel-Lucent et al., "Way Forward on 8Tx Codebook for Rel.10 DL MIMO", 3GPP TSG RAN WG1 62, Madrid, Spain, Aug. 23-27, 2010.

U.S. Appl. No. 61/390,423, filed Oct. 6, 2010.
U.S. Appl. No. 61/432,980, filed Jan. 14, 2011.
U.S. Appl. No. 61/390,511, filed Oct. 6, 2010.

Lee W. Young; Written Opinion of the International Searching Authority; Patent Cooperation Treaty; Sep. 21, 2010; International application No. PCT/IB 10/51088.

International Application PCT/IB2012/051511 Search Report dated Aug. 31, 2012.

U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.

Huang et al., "A Limited Feedback Precoding System with Hierarchical Codebook and Linear Receiver", IEEE Transactions on Wireless Communications, vol. 7, No. 12, pp. 4843-4848, Dec. 2008.

Kim et al., "Efficient Feedback via Subspace-Based Channel Quantization for Distributed Cooperative Antenna Systems with Temporarily Correlated Channels", EURASIP Journal on Advances in Signal Processing, vol. 2008, Nov. 23, 2007.

NTT DoCoMo, "Views on Codebook Design for Downlink 8Tx MIMO", 3GPP TSG RAN WG1 Meeting #59bis, Valencia, Spain, Jan. 18-22, 2010.

Alcatel Lucent, "Overview of Hierarchical Codebook Approach", 3GPP TSG RAN WG1 Meeting #59bis, Valencia, Spain, Jan. 18-22, 2009.

JP Patent Application # 2011-024295 Official Action dated Sep. 11, 2012.

Samsung, "Precoding for polarized 4Tx configurations", 3GPP TSG RAN WG1 Meeting #48bis, St Julian's, Malta, Mar. 26-30, 2007.

Mondal et al., "Rank-Independent Codebook Design from a Quaternary Alphabet", Proceedings of 41st Asilomar Conference on Signals, Systems and Computers (ACSSC), pp. 297-301, Nov. 7, 2007.

JP Patent Application # 2011-544111 Official Action dated Nov. 6, 2012.

\* cited by examiner

FIG. 4A

| Number of layers | Number of code words | Codeword-to-layer mapping $i = 0,1,...,M_{symb}^{layer}-1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ <br> $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ <br> $x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$ <br> $x^{(1)}(i) = d^{(1)}(2i)$ <br> $x^{(2)}(i) = d^{(1)}(2i+1)$ | $M_{symb}^{layer} = M_{symb}^{(0)} = M_{symb}^{(1)}/2$ |
| 3 | 1 | $x^{(0)}(i) = d^{(0)}(3i)$ <br> $x^{(1)}(i) = d^{(0)}(3i+1)$ <br> $x^{(2)}(i) = d^{(0)}(3i+2)$ | $M_{symb}^{layer} = M_{symb}^{(0)}/3$ |
| 4 | 2 | $x^{(0)}(i) = d^{(0)}(2i)$ <br> $x^{(1)}(i) = d^{(0)}(2i+1)$ <br> $x^{(2)}(i) = d^{(1)}(2i)$ <br> $x^{(3)}(i) = d^{(1)}(2i+1)$ | $M_{symb}^{layer} = M_{symb}^{(0)}/2 = M_{symb}^{(1)}/2$ |
| 4 | 1 | $x^{(0)}(i) = d^{(0)}(4i)$ <br> $x^{(1)}(i) = d^{(0)}(4i+1)$ <br> $x^{(2)}(i) = d^{(0)}(4i+2)$ <br> $x^{(3)}(i) = d^{(0)}(4i+3)$ | $M_{symb}^{layer} = M_{symb}^{(0)}/4$ |
| 5 | 2 | $x^{(0)}(i) = d^{(0)}(2i)$ <br> $x^{(1)}(i) = d^{(0)}(2i+1)$ <br> $x^{(2)}(i) = d^{(1)}(3i)$ <br> $x^{(3)}(i) = d^{(1)}(3i+1)$ <br> $x^{(4)}(i) = d^{(1)}(3i+2)$ | $M_{symb}^{layer} = M_{symb}^{(0)}/2 = M_{symb}^{(1)}/3$ |

FIG. 4B

| 6 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(3i)$<br>$x^{(4)}(i) = d^{(1)}(3i+1)$<br>$x^{(5)}(i) = d^{(1)}(3i+2)$ | $M_{symb}^{layer} = M_{symb}^{(0)}/3 = M_{symb}^{(1)}/3$ |
|---|---|---|---|
| 7 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(4i)$<br>$x^{(4)}(i) = d^{(1)}(4i+1)$<br>$x^{(5)}(i) = d^{(1)}(4i+2)$<br>$x^{(6)}(i) = d^{(1)}(4i+3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$<br>$x^{(4)}(i) = d^{(1)}(4i)$<br>$x^{(5)}(i) = d^{(1)}(4i+1)$<br>$x^{(6)}(i) = d^{(1)}(4i+2)$<br>$x^{(7)}(i) = d^{(1)}(4i+3)$ | $M_{symb}^{layer} = M_{symb}^{(0)}/4 = M_{symb}^{(1)}/4$ |

FIG. 5A

| Number of layers | Number of code words | Codeword-to-layer mapping $i = 0, 1, \ldots, M_{symb}^{layer} - 1$ |
|---|---|---|
| 1 | 1 | $x^{(0)}(i) = d^{(0)}(i)$    $M_{symb}^{layer} = M_{symb}^{(0)}$ |
| 2 | 2 | $x^{(0)}(i) = d^{(0)}(i)$ <br> $x^{(1)}(i) = d^{(1)}(i)$    $M_{symb}^{layer} = M_{symb}^{(0)} = M_{symb}^{(1)}$ |
| 2 | 1 | $x^{(0)}(i) = d^{(0)}(2i)$ <br> $x^{(1)}(i) = d^{(0)}(2i+1)$    $M_{symb}^{layer} = M_{symb}^{(0)}/2$ |
| 3 | 2 | $x^{(0)}(i) = d^{(0)}(i)$ <br> $x^{(1)}(i) = d^{(1)}(2i)$    $M_{symb}^{layer} = M_{symb}^{(0)} = M_{symb}^{(1)}/2$ <br> $x^{(2)}(i) = d^{(1)}(2i+1)$ |
| 3 | 1 | $x^{(0)}(i) = d^{(0)}(3i)$ <br> $x^{(1)}(i) = d^{(0)}(3i+1)$    $M_{symb}^{layer} = M_{symb}^{(0)}/3$ <br> $x^{(2)}(i) = d^{(0)}(3i+2)$ |
| 4 | 2 | $x^{(0)}(i) = d^{(0)}(2i)$ <br> $x^{(1)}(i) = d^{(0)}(2i+1)$ <br> $x^{(2)}(i) = d^{(1)}(2i)$    $M_{symb}^{layer} = M_{symb}^{(0)}/2 = M_{symb}^{(1)}/2$ <br> $x^{(3)}(i) = d^{(1)}(2i+1)$ |
| 4 | 1 | $x^{(0)}(i) = d^{(0)}(4i)$ <br> $x^{(1)}(i) = d^{(0)}(4i+1)$ <br> $x^{(2)}(i) = d^{(0)}(4i+2)$    $M_{symb}^{layer} = M_{symb}^{(0)}/4$ <br> $x^{(3)}(i) = d^{(0)}(4i+3)$ |
| 5 | 2 | $x^{(0)}(i) = d^{(0)}(3i)$ <br> $x^{(1)}(i) = d^{(0)}(3i+1)$ <br> $x^{(2)}(i) = d^{(0)}(3i+2)$    $M_{symb}^{layer} = M_{symb}^{(0)}/3 = M_{symb}^{(1)}/2$ <br> $x^{(3)}(i) = d^{(1)}(2i)$ <br> $x^{(4)}(i) = d^{(1)}(2i+1)$ |

FIG. 5B

| 6 | 2 | $x^{(0)}(i) = d^{(0)}(3i)$<br>$x^{(1)}(i) = d^{(0)}(3i+1)$<br>$x^{(2)}(i) = d^{(0)}(3i+2)$ $\quad M_{symb}^{layer} = M_{symb}^{(0)}/3 = M_{symb}^{(1)}/3$<br>$x^{(3)}(i) = d^{(1)}(3i)$<br>$x^{(4)}(i) = d^{(1)}(3i+1)$<br>$x^{(5)}(i) = d^{(1)}(3i+2)$ |
|---|---|---|
| 7 | 2 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+2)$ $\quad M_{symb}^{layer} = M_{symb}^{(0)}/4 = M_{symb}^{(1)}/3$<br>$x^{(4)}(i) = d^{(1)}(3i)$<br>$x^{(5)}(i) = d^{(1)}(3i+1)$<br>$x^{(6)}(i) = d^{(1)}(3i+2)$ |
| 8 | 2 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$ $\quad M_{symb}^{layer} = M_{symb}^{(0)}/4 = M_{symb}^{(1)}/4$<br>$x^{(4)}(i) = d^{(1)}(4i)$<br>$x^{(5)}(i) = d^{(1)}(4i+1)$<br>$x^{(6)}(i) = d^{(1)}(4i+2)$<br>$x^{(7)}(i) = d^{(1)}(4i+3)$ |

FIG. 6A

| Number of layers | Number of code words | Codeword-to-layer mapping $i = 0,1,...,M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$<br>$x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i+1)$ | $M_{symb}^{layer} = M_{symb}^{(0)} = M_{symb}^{(1)}/2$ |
| 3 | 1 | $x^{(0)}(i) = d^{(0)}(3i)$<br>$x^{(1)}(i) = d^{(0)}(3i+1)$<br>$x^{(2)}(i) = d^{(0)}(3i+2)$ | $M_{symb}^{layer} = M_{symb}^{(0)}/3$ |
| 4 | 2 | $x^{(0)}(i) = d^{(0)}(2i)$<br>$x^{(1)}(i) = d^{(0)}(2i+1)$<br>$x^{(2)}(i) = d^{(1)}(2i)$<br>$x^{(3)}(i) = d^{(1)}(2i+1)$ | $M_{symb}^{layer} = M_{symb}^{(0)}/2 = M_{symb}^{(1)}/2$ |
| 4 | 1 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$ | $M_{symb}^{layer} = M_{symb}^{(0)}/4$ |
| 5 | 2 | $x^{(0)}(i) = d^{(0)}(2i)$<br>$x^{(1)}(i) = d^{(0)}(2i+1)$<br>$x^{(2)}(i) = d^{(1)}(3i)$<br>$x^{(3)}(i) = d^{(1)}(3i+1)$<br>$x^{(4)}(i) = d^{(1)}(3i+2)$ | $M_{symb}^{layer} = M_{symb}^{(0)}/2 = M_{symb}^{(1)}/3$ |

FIG. 6B

| 6 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(3i)$<br>$x^{(4)}(i) = d^{(1)}(3i+1)$<br>$x^{(5)}(i) = d^{(1)}(3i+2)$ $\quad M_{symb}^{layer} = M_{symb}^{(0)}/3 = M_{symb}^{(1)}/3$ |
|---|---|---|
| 7 | 2 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+2)$<br>$x^{(4)}(i) = d^{(1)}(3i)$<br>$x^{(5)}(i) = d^{(1)}(3i+1)$<br>$x^{(6)}(i) = d^{(1)}(3i+2)$ $\quad M_{symb}^{layer} = M_{symb}^{(0)}/4 = M_{symb}^{(1)}/3$ |
| 8 | 2 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$<br>$x^{(4)}(i) = d^{(1)}(4i)$<br>$x^{(5)}(i) = d^{(1)}(4i+1)$<br>$x^{(6)}(i) = d^{(1)}(4i+2)$<br>$x^{(7)}(i) = d^{(1)}(4i+3)$ $\quad M_{symb}^{layer} = M_{symb}^{(0)}/4 = M_{symb}^{(1)}/4$ |

FIG. 7A

| Number of layers | Number of code words | Codeword-to-layer mapping $i = 0,1,...,M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$<br>$x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i+1)$ | $M_{symb}^{layer} = M_{symb}^{(0)} = M_{symb}^{(1)}/2$ |
| 3 | 1 | $x^{(0)}(i) = d^{(0)}(3i)$<br>$x^{(1)}(i) = d^{(0)}(3i+1)$<br>$x^{(2)}(i) = d^{(0)}(3i+2)$ | $M_{symb}^{layer} = M_{symb}^{(0)}/3$ |
| 4 | 2 | $x^{(0)}(i) = d^{(0)}(2i)$<br>$x^{(1)}(i) = d^{(0)}(2i+1)$<br>$x^{(2)}(i) = d^{(1)}(2i)$<br>$x^{(3)}(i) = d^{(1)}(2i+1)$ | $M_{symb}^{layer} = M_{symb}^{(0)}/2 = M_{symb}^{(1)}/2$ |
| 4 | 1 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$ | $M_{symb}^{layer} = M_{symb}^{(0)}/4$ |
| 5 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(2i)$<br>$x^{(4)}(i) = d^{(1)}(2i+1)$ | $M_{symb}^{layer} = M_{symb}^{(0)}/3 = M_{symb}^{(1)}/2$ |

FIG. 7B

| 6 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(3i)$<br>$x^{(4)}(i) = d^{(1)}(3i+1)$<br>$x^{(5)}(i) = d^{(1)}(3i+2)$ | $M_{symb}^{layer} = M_{symb}^{(0)}/3 = M_{symb}^{(1)}/3$ |
|---|---|---|---|
| 7 | 2 | $x^{(0)}(i) = d^{(0)}(3i)$<br>$x^{(1)}(i) = d^{(0)}(3i+1)$<br>$x^{(2)}(i) = d^{(0)}(3i+2)$<br>$x^{(3)}(i) = d^{(1)}(4i)$<br>$x^{(4)}(i) = d^{(1)}(4i+1)$<br>$x^{(5)}(i) = d^{(1)}(4i+2)$<br>$x^{(6)}(i) = d^{(1)}(4i+3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$<br>$x^{(4)}(i) = d^{(1)}(4i)$<br>$x^{(5)}(i) = d^{(1)}(4i+1)$<br>$x^{(6)}(i) = d^{(1)}(4i+2)$<br>$x^{(7)}(i) = d^{(1)}(4i+3)$ | $M_{symb}^{layer} = M_{symb}^{(0)}/4 = M_{symb}^{(1)}/4$ |

EFFICIENT MIMO TRANSMISSION SCHEMES

CROSS-REFERENCE TO RELATED APPLICATIONS

This application claims the benefit of U.S. Provisional Patent Application 61/142,735, filed Jan. 6, 2009, and U.S. Provisional Patent Application 61/175,197, filed May 4, 2009, whose disclosures are incorporated herein by reference.

FIELD OF THE INVENTION

The present invention relates generally to communication systems, and particularly to methods and systems for transmission using multiple antennas.

BACKGROUND OF THE INVENTION

Some communication systems transmit data from a transmitter to a receiver over multiple communication channels, using multiple transmit antennas and multiple receive antennas. Multiple-channel transmission is used, for example, in spatial multiplexing schemes that achieve high throughput, in beam-forming schemes that achieve high antenna directivity and in spatial diversity schemes that achieve high resilience against channel fading and multipath. These schemes are often referred to collectively as Multiple-Input Multiple-Output (MIMO) schemes.

MIMO schemes are contemplated, for example, for use in Evolved Universal Terrestrial Radio Access (E-UTRA) systems, also referred to as Long Term Evolution (LTE) systems. The Third Generation Partnership Project (3GPP) E-UTRA standards specify MIMO schemes for use by E-UTRA User Equipment (UE) and base stations (eNodeB). These schemes are described, for example, in 3GPP Technical Specification 36.211, entitled "Technical Specification Group Radio Access Network; Evolved Universal Terrestrial Radio Access (E-UTRA); Physical Channels and Modulation (Release 8)," (3GPP TS 36.211), version 8.6.0, March, 2009, in 3GPP Technical Specification 36.213, entitled "Technical Specification Group Radio Access Network; Evolved Universal Terrestrial Radio Access (E-UTRA); Physical Layer Procedures (Release 8)," (3GPP TS 36.213), version 8.6.0, March, 2009, and in 3GPP Technical Report 36.814, entitled "Technical Specification Group Radio Access Network; Further Advancements for E-UTRA Physical Layer Aspects (Release 9)," (3GPP TR 36.814), version 0.4.1, February, 2009, which are incorporated herein by reference.

SUMMARY OF THE INVENTION

An embodiment of the present invention provides a method for communication in a transmitter having a first number of transmit antenna ports. In accordance with the disclosed method, an upper limit is set on a second number of spatial layers to be used by the transmitter to be less than the first number. An actual number of the spatial layers, which does not exceed the upper limit, is allocated for transmission to a given receiver. One or more streams of modulated symbols are mapped onto the allocated actual number of the spatial layers. The actual number of the spatial layers is transmitted from the transmitter to the given receiver.

In some embodiments, transmitting the spatial layers includes applying a preceding operation that maps the spatial layers onto the transmit antenna ports, and setting the upper limit includes setting a first upper limit when the precoding operation depends on feedback from the given receiver, and setting a second upper limit, which does not exceed the first upper limit, when the preceding operation is not dependent on the feedback.

In an embodiment, input data is encoded with an Error Correction Code (ECC) to produce a given number of code words, and the code words are modulated to produce the respective given number of the streams of the modulated symbols, wherein the given number of the code words is restricted to be at most two.

In a disclosed embodiment, when the actual number of spatial layers is between one and four, the modulated symbols are mapped onto the layers in accordance with the table shown in FIG. 4A in which $d^{(q)}(n)$ denotes an $n^{th}$ modulated symbol originating from a code word q, and $x^{(p)}(n)$ denotes an $n^{th}$ value of a spatial layer p.

In another embodiment, when the actual number of spatial layers is between five and eight, the modulated symbols are mapped onto the layers in accordance with the table shown in FIGS. 4A and 4B.

In yet another embodiment, when the actual number of spatial layers is between five and eight, the modulated symbols are mapped onto the layers in accordance with the table shown in FIGS. 5A and 5B.

In still another embodiment, when the actual number of spatial layers is between five and eight, the modulated symbols are mapped onto the layers in accordance with the table shown in FIGS. 6A and 6B.

In another embodiment, when the actual number of spatial layers is between five and eight, the modulated symbols are mapped onto the layers in accordance with the table shown in FIGS. 7A and 7B.

In some embodiments, the first number is greater than four. In an embodiment, the first number is equal to eight, and the upper limit is between four and seven.

In an embodiment, allocating the actual number of the spatial layers includes signaling the actual number to the given receiver using a signaling protocol in which a data structure allocated to signaling the actual number is insufficient for signaling values higher than the upper limit. Additionally or alternatively, allocating the actual number of the spatial layers may include signaling from the given receiver to the transmitter a preferred number of the spatial layers using a signaling protocol in which a data structure allocated to signaling the preferred number is insufficient for signaling values higher than the upper limit. In a disclosed embodiment, the spatial layers include respective parallel streams transmitted concurrently from the transmitter to the given receiver.

There is additionally provided, in accordance with an embodiment of the present invention, a method for communication in a transmitter having a plurality of transmit antenna ports and is operative to map streams of modulated symbols onto spatial layers. In accordance with the disclosed method, a preceding operation is selected for use in mapping the spatial layers onto the transmit antenna ports. An upper limit is set on a number of the spatial layers depending on the selected preceding operation. One or more of the streams of the modulated symbols are mapped onto the number of spatial layers that does not exceed the upper limit. The selected precoding operation is applied to the spatial layers so as to map the spatial layers onto the transmit antenna ports. The precoded spatial layers are transmitted over the transmit antenna ports to a receiver.

In some embodiments, setting the upper limit includes setting a first upper limit when the selected precoding operation depends on feedback from the receiver, and setting a second upper limit, which is less than the first upper limit, when the selected precoding operation is not dependent on the feedback. In an embodiment, input data is encoded with an Error Correction Code (ECC) to produce a given number of code words, and the code words are modulated to produce the streams of the modulated symbols, wherein the given number of the code words is restricted to be at most two. In a disclosed embodiment, mapping the streams onto the spatial layers includes signaling the number of the spatial layers to the receiver using a signaling protocol in which a data structure allocated to signaling the number of the spatial layers is insufficient for signaling values higher than the upper limit. Additionally or alternatively, mapping the streams onto the spatial layers includes signaling from the receiver to the transmitter a preferred number of the spatial layers using a signaling protocol in which a data structure allocated to signaling the preferred number is insufficient for signaling values higher than the upper limit. In some embodiments, the spatial layers include respective parallel streams transmitted concurrently from the transmitter to the receiver.

There is also provided, in accordance with an embodiment of the present invention, a communication apparatus, which includes a transmitter and a first number of transmit antenna ports. The transmitter is configured to set an upper limit on a second number of, spatial layers to be used by the transmitter to be less than the first number, to allocate an actual number of the spatial layers, which does not exceed the upper limit, for transmission to a given receiver, to map one or more streams of modulated symbols onto the allocated actual number of the spatial layers, and to transmit the actual number of the spatial layers simultaneously to the given receiver. The transmitter may be included in a mobile communication terminal or in a base station.

There is further provided, in accordance with an embodiment of the present invention, a communication apparatus, which includes a transmitter and a first number of transmit antenna ports. The transmitter is configured to map streams of modulated symbols onto spatial layers, to select a precoding operation for use in mapping the spatial layers onto the transmit antenna ports, to set an upper limit on a number of the spatial layers depending on the selected precoding operation, to map one or more of the streams of the modulated symbols onto the number of spatial layers that does not exceed the upper limit, to apply the selected precoding operation to the spatial layers so as to map the spatial layers onto the transmit antenna ports, and to transmit the precoded spatial layers over the transmit antenna ports to a receiver. The transmitter may be included in a mobile communication terminal or in a base station.

The present invention will be more fully understood from the following detailed description of the embodiments thereof, taken together with the drawings in which:

BRIEF DESCRIPTION OF THE DRAWINGS

FIGS. 4A-7B are tables showing mapping of code words to spatial layers, in accordance with embodiments of the present invention.

DETAILED DESCRIPTION OF EMBODIMENTS

Figure 1:
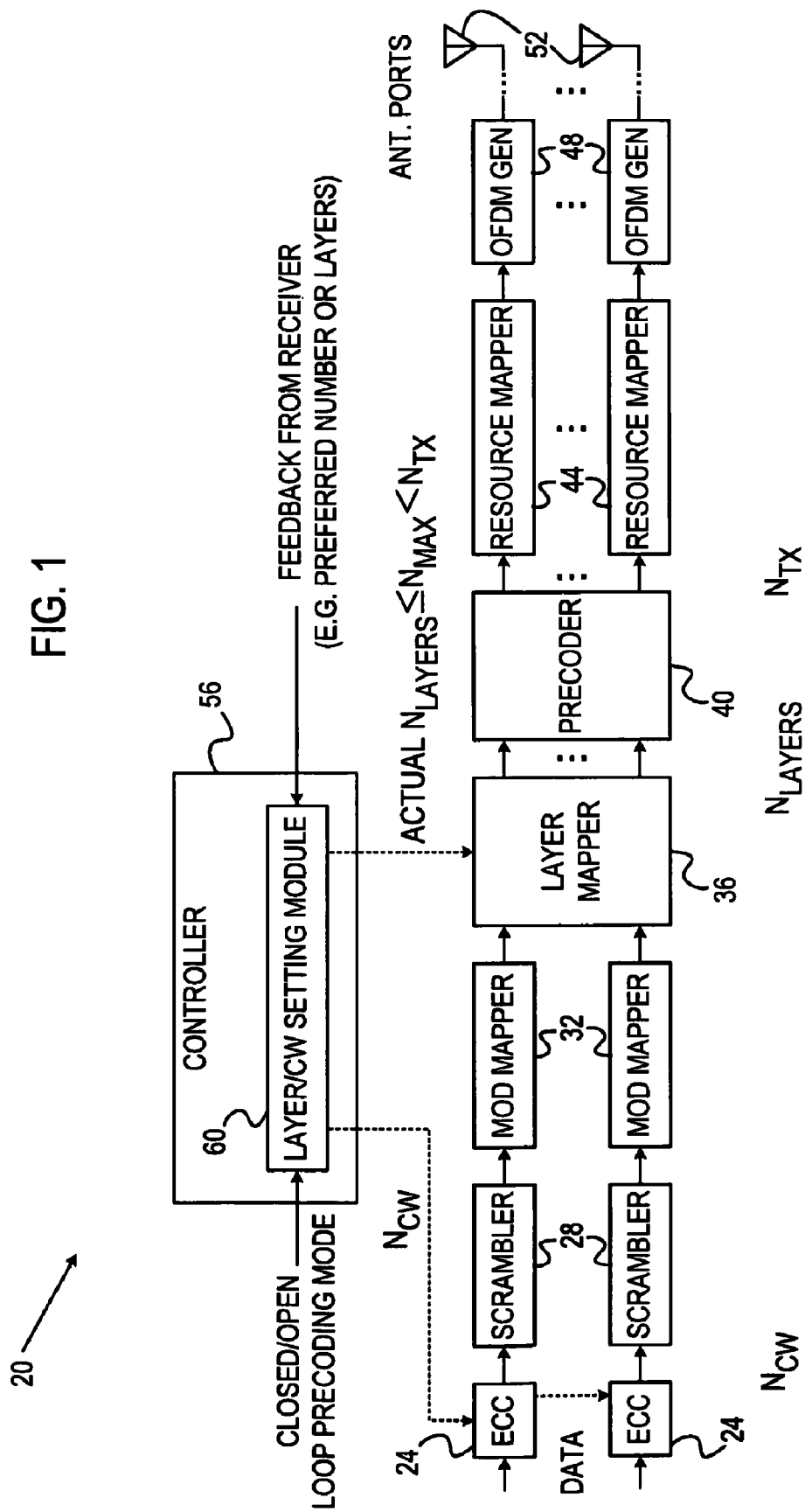
FIG. 1 is a block diagram that schematically illustrates a transmitter having multiple antennas, in accordance with an embodiment of the present invention.

In some known MIMO schemes, a transmitter maps streams of modulated symbols onto spatial layers, i.e., signals that are to be transmitted over different MIMO transmission channels. The spatial layers are also referred to as transmission layers or spatial streams, or simply layers for brevity. The transmitter then applies a precoding operation to map each spatial layer onto a respective set of antenna ports. A transmission process of this sort, as performed in the downlink of a E-UTRA eNodeB, is described in detail in section 6.3 of the 3GPP TS 36.211 specification, cited above.

Embodiments of the present invention that are described hereinbelow provide improved transmitter configurations and transmission methods, which reduce the complexity of MIMO transmitters and simplify the above-mentioned transmission process and associated signaling.

Generally, the number of spatial layers that are actually used for transmission from a given transmitter to a given receiver may be varied according to channel conditions. In conventional E-UTRA systems, for example, the number of spatial layers may reach $\min(N_{TX}, N_{RX})$, wherein $N_{TX}$ and $N_{RX}$ denote the number of transmit and receive antenna ports, respectively. In many cases, however, it may be advantageous to use an even lower number of spatial layers.

Typically, the actual number of layers that can be used depends on the level of correlation among the different communication channels between the transmitter and the receiver (i.e., between different transmit and receive antenna pairs). Low correlation usually implies that a large number of parallel transmission streams can be transmitted and reconstructed successfully, meaning that a large number of layers can be used. High correlation usually means that the number of layers should be small.

In most cases, at least some correlation exists among the multiple communication channels, and therefore the likelihood of exploiting the maximum theoretical number of layers is small. Consequently, in most practical scenarios, it is sufficient to limit the number of actual layers to a value that is less than the maximum theoretical limit of $\min(N_{TX}, N_{RX})$. Thus, in some embodiments of the present invention, the transmitter limits the number of layers to be less than the number of transmit antennas. This limit is typically set a-priori, irrespective of channel conditions or the number of receive antennas in any given receiver. Limiting the maximum number of layers reduces the complexity of the transmitter considerably. The benefit of this technique is particularly significant in evolving LTE-Advanced (LTE-A) systems, which may use up to eight transmit antennas and eight receive antennas.

In some embodiments, the transmitter sets different upper limits on the number of layers depending on feedback from the receiver and/or the type of precoding operation used. For example, when precoding is adaptive based on feedback from the receiver, in other words when precoding is performed in closed loop, the ability to exploit the spatial multiplexing gain of the multiple channels is relatively high, and therefore the transmitter may allow a higher maximum number of layers. On the other hand, when precoding is performed in open loop, i.e., without feedback from the receiver, the transmitter may set a lower limit on the maximum number of layers.

FIG. 1 is a block diagram that schematically illustrates a transmitter 20 having multiple antennas, in accordance with an embodiment of the present invention. The description that follows refers to a transmitter of an LTE-A eNodeB, although other transmitters are contemplated. In alternative embodiments, for example, the methods and systems described herein can be used in transmitters operating in accordance with any other suitable communication standard or protocol, such as IEEE 802.16 (also referred to as WiMAX), for example. Although the description that follows refers mainly to downlink transmission from the eNodeB to the UE, the disclosed methods and systems may be applicable to uplink transmission, as well.

Transmitter 20 comprises one or more modulation chains, each comprising an Error Correction Code (ECC) encoder 24, a scrambler 28 and a modulation mapper 32. Data for transmission is encoded by ECC encoders 24, to produce respective ECC code words. (The example of FIG. 1 shows two separate ECC encoders for clarity. In practice, however, the transmitter may comprise a single ECC encoder that produces code words for the different modulation chains.) The number of code words that are used for encoding a given transmission is referred to as $N_{CW}$. Certain aspects regarding the choice of this value are addressed further below.

The bits of each code word are scrambled by a respective scrambler 28, and then modulated by a respective modulation mapper 32. Each modulation mapper produces a stream of complex-valued modulated symbols. Any suitable modulation scheme, such as Quadrature Phase Shift Keying (QPSK) or Quadrature Amplitude Modulation (QAM), can be used. A given modulation mapper 32 operates on the scrambled bits of a given code word denoted q (q=0,1, ..., $N_{CW}$−1) to produce a block of $M_{symb}^{(q)}$ complex-valued modulated symbols denoted $$d^{(q)}(0), d^{(q)}(1), \ldots, d^{(q)}(M_{symb}^{(q)}-1).$$

A layer mapper 36 maps the modulated symbol streams produced by modulation mappers 32 onto one or more spatial layers. (For a given set of time and frequency resources allocated to a certain communication channel, the multiple transmit and receive antennas add another "spatial" dimension to those resources. One of the possibilities to exploit the additional spatial dimension is by increasing the number of independent modulated symbols transmitted per time-frequency resource. The factor of increase, relative to the case of a single transmit antenna and a single receive antenna, is defined as the number of spatial layers.)

The actual number of spatial layers used by mapper 36 is denoted $N_{LAYERS}$, and is a selectable parameter. The choice of this value may depend, for example, on the channel conditions between transmitter 20 and a given receiver to which the transmission is intended. Each spatial layer comprises a stream of complex values, which are to be subsequently transmitted over the MIMO communication channel. In some embodiments, transmitter 20 sets an upper limit on the value of $N_{LAYERS}$, as will be discussed in detail further below. Several suitable mapping schemes that can be used by layer mapper 36 are shown in FIG. 4A-7B below.

The mapped spatial layers are provided to a precoder 40. Precoder 40 maps the $N_{LAYERS}$ spatial layers onto $N_{TX}$ transmission channels, corresponding to $N_{TX}$ antenna ports 52 of the transmitter. (Note that a given antenna port may not necessarily correspond to a single physical antenna, but may correspond to a "virtual antenna" whose transmitted signal is generated—in a manner that the receiver need not necessarily be aware of—as a superposition (a weighted sum) of the signals stemming from a number of physical antennas. Note also that the number of antenna ports may be larger than the number of layers.) Resource mappers 44 allocate resource elements (time-frequency allocations) to the respective transmission channels. The outputs of mappers 44 are processed by respective Orthogonal Frequency Division Multiplexing (OFDM) generators 48, which produce OFDM signals that are transmitted via antenna ports 52 toward the receiver.

Transmitter 20 comprises a controller 56, which configures and controls the different transmitter elements. In particular, controller 56 comprises a layer and code word setting module 60, which sets the number of spatial layers and the number of code words to be used by the transmitter. The functions of module 60 are explained in detail below.

The transmitter configuration shown in FIG. 1 is a simplified example configuration, which is depicted for the sake of conceptual clarity. In alternative embodiments, any other suitable transmitter configuration can also be used. For example, although the embodiments described herein refer mainly to transmitters having eight transmit antenna ports, the methods and systems described herein can be used with any other suitable number of antenna ports. Transmitter elements that are not mandatory for explanation of the disclosed techniques, such as various Radio Frequency (RF) elements, have been omitted from FIG. 1 for the sake of clarity.

The different components of transmitter 20 may be implemented using dedicated hardware, such as using one or more Application-Specific Integrated Circuits (ASICs) and/or Field-Programmable Gate Arrays (FPGAs). Alternatively, some transmitter components may be implemented using software running on general-purpose hardware, or using a combination of hardware and software elements. Typically, controller 56 comprises a general-purpose processor, which is programmed in software to carry out the functions described herein, although it too may be implemented on dedicated hardware. The software may be downloaded to the processor in electronic form, over a network, for example, or it may, alternatively or additionally, be provided and/or stored on tangible media, such as magnetic, optical, or electronic memory.

When transmitter 20 transmits to a given receiver (not shown in the figures), module 60 typically sets the actual number of spatial layers ($N_{LAYERS}$) according to the channel conditions between the transmitter and the receiver. In accordance with an embodiment, the maximum possible number of layers is given by min($N_{TX}$, $N_{RX}$), wherein $N_{TX}$ and $N_{RX}$ denote the number of transmit and receive antenna ports, respectively. Module 60 typically selects the actual number of layers adaptively, in an attempt to maximize the data throughput that can be transferred reliably to the receiver over the present channel (and noise-plus-interference).

The number of layers that is predicted to yield the maximal throughput is sometimes called the "MIMO channel rank." In some cases (e.g., when the transmitter lacks reliable information as to the channel conditions) the receiver notifies the transmitter as to the "preferred rank" (e.g., a rank indicator, in the terminology of section 7 of the 3GPP TS 36.213 specification, cited above). In some embodiments, module 60 sets the actual number of layers based on the preferred rank that is fed-back from the receiver. The statistics of which ranks are preferable in scenarios of varying (e.g. fading) channels typically depends on the amount of correlation among the different communication channels between the transmitter and the receiver (i.e., between the different transmit and receive antenna pairs) and on the Signal-to-Noise Ratio (SNR) at the receiver. Lower ranks are more likely to be preferable at low SNR and/or in highly-correlated channels, and vice versa.

When the communication channels exhibit little correlation and/or provide a relatively high SNR, the receiver is more likely to succeed decoding a large number of spatial layers. In such cases, in accordance with an embodiment of the invention, module 60 typically sets a relatively large number of layers, so as to provide a relatively high data throughput. However, when the communication channels are highly correlated and/or lead to a relatively low SNR, the receiver is only likely to succeed decoding a smaller number of spatial layers. In such cases, module 60 may reduce the number of actual layers accordingly.

In practice, however, the likelihood of reaching and exploiting the theoretical maximum number of layers min ($N_{TX}$, $N_{RX}$) is very low; In most practical scenarios, at least some correlation exists among the multiple communication channels, and the situation where the maximum number of layers is beneficial—namely, a very high SNR—is seldom reached.

Therefore, in some embodiments, module 60 in transmitter 20 sets an upper limit, which is less than the above-mentioned theoretical limit, on the number of spatial layers. Typically, this upper limit is applied to the transmitter operation as a whole, irrespective of any given receiver. The upper limit is therefore expressed in terms of the number of transmit antenna ports. In other words, transmitter 20 may limit $N_{LAYERS}$ to a value that is less than (and not equal to) $N_{TX}$. The upper limit is denoted $N_{MAX}$ herein. For example, in an LTE-A eNodeB having eight transmit antenna ports ($N_{TX}$=8), module 60 may set the upper limit to $N_{MAX}$=4, $N_{MAX}$=5, $N_{MAX}$=6 or $N_{MAX}$=7. Alternatively, any other suitable values of $N_{TX}$ and $N_{MAX}$ can also be used.

For a given value of $N_{TX}$, the choice of $N_{MAX}$ trades-off transmitter complexity and performance. Higher $N_{MAX}$ corresponds to a potentially-higher maximum throughput, but on the other hand means that the transmitter is required to store larger mapping tables and support simultaneous processing (e.g., mapping and precoding) of a higher number of symbol streams. Lower $N_{MAX}$ simplifies the transmitter at the expense of potentially-lower maximum throughput. Since the likelihood of approaching the maximum throughput in real-life scenarios is low, as explained above, limiting $N_{MAX}$ to values less than the number of transmit antenna ports is often a preferable trade-off.

Moreover, limiting the number of layers enables reduction of signaling resources, which are used for signaling the actual number of layers between the transmitter and the receiver (and/or signaling the preferred number of layers as feedback from the receiver to the transmitter, as noted above). For example, if the maximum number of layers is reduced from eight to four (i.e., $N_{LAYERS} \leq N_{MAX}$=4), the transmitter can report the value of $N_{LAYERS}$ to the receiver using only two bits instead of three. If $N_{MAX}$ is set to six ($N_{LAYERS} \leq N_{MAX}$=6), three signaling bits are still needed, but only six out of the eight possible bit value combinations are used for signaling $N_{LAYERS}$. The remaining two bit value combinations are free, and can be reserved for any other suitable purpose. Thus, in some embodiments, transmitter 20 signals $N_{LAYERS}$ to the receiver using a signaling protocol in which the signaling resources (e.g., a field or other data structure), which are allocated to signaling the actual number of layers, are insufficient for signaling values higher than $N_{MAX}$.

As noted above, in some embodiments the receiver notifies the transmitter of the preferred number of layers to be used (e.g., using a rank indicator field). In these embodiments, the protocol used for signaling the preferred number of layers to the transmitter may be defined so that signaling resources (e.g., a field or other data structure), which are allocated to signaling the preferred number of layers, are insufficient for signaling values higher than $N_{MAX}$.

Figure 2:
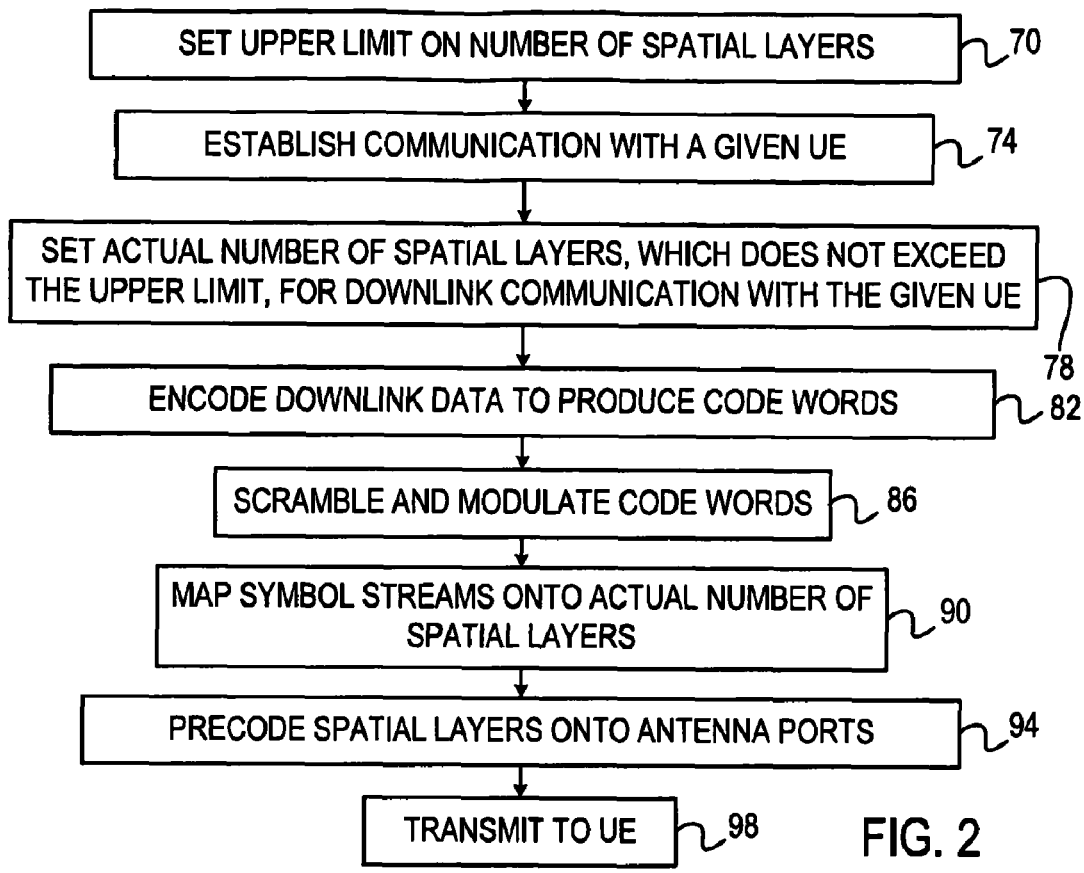
FIGS. 2 and 3 are flow charts that schematically illustrate methods for transmission via multiple antennas, in accordance with embodiments of the present invention.

FIG. 2 is a flow chart that schematically illustrates a method for transmission via multiple antennas, in accordance with an embodiment of the present invention. In the present example, transmitter 20 is disposed in an LTE-A base station (eNodeB), which may communicate with multiple UEs. The method begins with transmitter 20 setting an upper limit ($N_{MAX}$) on the number of spatial layers to be used for downlink transmission, at a limiting step 70. The upper limit is less than the number of transmit antenna ports of transmitter 20, i.e., $N_{MAX} < N_{TX}$.

The eNodeB, and in particular transmitter 20, establishes communication with a given UE, at a communication set-up step 74. Based on the channel conditions between the eNodeB and this UE, module 60 in transmitter 20 selects an actual number of spatial layers ($N_{LAYERS}$) for downlink communication with the given UE, at an actual layer selection step 78. Module 60 selects an actual number that does not exceed the upper limit set at step 70 above, i.e., $N_{LAYERS} \leq N_{MAX}$. (Additionally or alternatively, the actual number of layers may be set based on closed-loop channel condition information that is fed-back from the receiver and/or on a-priori determination of channel condition information. The actual number of layers may be different for closed-loop and open-loop operation. These features are described in detail further below.)

The transmitter communicates with the given UE using the selected actual number of layers. ECC encoders 24 encode the data for transmission so as to produce $N_{CW}$ ECC code words, at an ECC encoding step 82. Scramblers 28 scramble the bits of each code word, and modulation mappers 32 modulate the scrambled bits to produce streams of encoded symbols, at a modulation step 86. The output of step 86 is a set of $N_{CW} \geq 1$ streams of modulated symbols. Layer mapper 36 maps the $N_{CW}$ streams of modulated symbols onto the $N_{LAYERS}$ spatial layers, at a layer mapping step 90. Any suitable mapping scheme can be used, such as the illustrative mapping schemes described in FIGS. 4A-7B below.

Precoder 40 maps the $N_{LAYERS}$ spatial layers onto the $N_{TX}$ transmit antenna ports 52 of transmitter 20, at a precoding step 94. The transmitter transmits the precoded spatial layers via the transmit antenna ports to the given UE, at a transmission step 98.

In some embodiments, module 60 selectively limits the maximum number of code words per transmission ($N_{CW}$) to be less than the actual number of layers. For example, module 60 may limit the value of $N_{CW}$ to no more than 2 (i.e., $N_{CW} \in \{1,2\}$). Reducing the number of code words per transmission simplifies the transmitter and reduces the signaling resources needed for signaling the selected $N_{CW}$ value (and/or other information that is signaled per code word) to the receiver. On the other hand, a lower $N_{CW}$ value may somewhat degrade the receiver performance, for example in receivers that use Sequential Interference Cancellation (SIC) techniques. Nevertheless, in most cases a maximum of $N_{CW}$=2 provides good receiver performance, even for $N_{LAYERS}$=8. Increasing $N_{CW}$ beyond this value may not provide additional performance that justifies the associated complexity. The layer mapping examples given in FIGS. 4A-7B below demonstrate mapping of one or two code words onto up to eight spatial layers.

In some embodiments, transmitter 20 sets different upper limits on the number of layers, depending on the type of precoding operation applied by precoder 40. Precoder 40 may apply closed-loop or open-loop precoding. For example, closed- and open-loop precoding in E-UTRA systems are described in sections 6.3.4.2.1 and 6.3.4.2.2 of 3GPP TS 36.211, cited above, and in section 7 of 3GPP TS 36.213, cited above. In closed-loop precoding, the mapping of spatial layers to antenna ports is adaptive based on feedback provided by the receiver. For example, in some embodiments the transmitter and receiver support a predefined set (a "codebook") of precoding schemes, usually expressed as precoding matrices. The receiver notifies the transmitter which precoding scheme is preferable at a given point in time, and the transmitter selects and applies the mapping scheme requested by the receiver. In open-loop preceding, the transmitter applies a certain preceding scheme irrespective of feedback from the receiver.

When the transmitter uses closed-loop preceding, link adaptation may track the channel conditions relatively accurately, and the receiver may better exploit the potential spatial multiplexing gain of the multiple channels. When using open-loop preceding, on the other hand, the actual spatial multiplexing gain is likely to be lower. Therefore, using a large number of spatial layers is more likely to produce high performance under closed-loop preceding than under open-loop preceding. Thus, in some embodiments, transmitter 20 sets a certain upper limit (denoted $N_{MAX\_OL}$) on the number of layers when using open-loop preceding, and another upper limit (denoted $N_{MAX\_CL}$) on the number of layers when using closed-loop preceding, wherein $N_{MAX\_OL} < N_{MAX\_CL}$.

Figure 3:
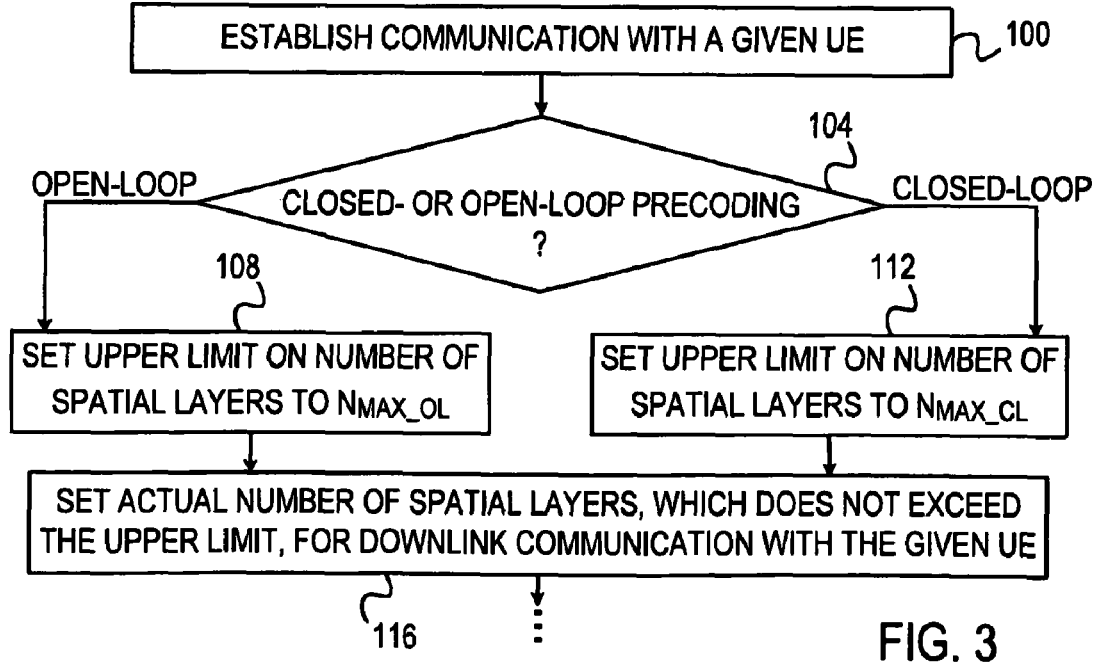

FIG. 3 is a flow chart that schematically illustrates a method for transmission via multiple antennas, in accordance with an embodiment of the present invention. The method of FIG. 3 begins with transmitter 20 establishing communication with a given UE, at a communication establishing step 100. Controller 56 in transmitter 20 checks whether open- or closed-loop preceding is used with this UE, at a preceding mode checking step 104. If open-loop preceding is used, module 60 sets $N_{MAX} = N_{MAX\_OL}$, at an open-loop layer limiting step 108. Otherwise, i.e., if closed-loop preceding is used, module 60 sets $N_{MAX} = N_{MAX\_CL}$, at a closed-loop layer limiting step 112. As noted above, $N_{MAX\_OL} < N_{MAX\_CL}$.

Having selectably limited the number of spatial layers to either $N_{MAX\_OL}$ or $N_{MAX\_CL}$ depending on the preceding mode, transmitter 20 sets the actual number of layers $N_{LAYERS}$ to values that do not exceed the applicable upper limit, at a layer setting step 116. From this stage, the method continues similarly to steps 82-98 of the method of FIG. 2 above.

In some embodiments, $N_{LAYERS}$ is limited to be less than $N_{TX}$ only when the number of antenna ports is high, and $N_{LAYERS} = N_{TX}$ is allowed below a certain number of antenna ports. This technique can be used to maintain backward compatibility with conventional schemes, e.g., with LTE systems conforming to the TS 36.211 and 36.213 specifications, cited above. For example, the constraints on the number of layers can be set to $1 \leq N_{LAYERS} \leq \min(N_{TX}, N_{RX})$ if $\min(N_{TX}, N_{RX}) \leq 4$, to $1 \leq N_{LAYERS} \leq N_{MAX\_CL} < \min(N_{TX}, N_{RX})$ if $\min(N_{TX}, N_{RX}) > 4$ and closed-loop preceding is used, and to $1 \leq N_{LAYERS} \leq N_{MAX\_OL} < \min(N_{TX}, N_{RX})$ if $\min(N_{TX}, N_{RX}) > 4$ and open-loop preceding is used.

FIGS. 4A-7B are tables showing mapping examples of code words to spatial layers, in accordance with embodiments of the present invention. FIGS. 4A and 4B show one mapping example, FIGS. 5A and 5B show a second example, FIGS. 6A and 6B show a third example, and FIGS. 7A and 7B show a fourth example. All four examples refer to an LTE-A eNodeB having eight antenna ports. These four examples are in no way limiting. The methods and systems described herein may use any other suitable mapping scheme.

In a given example, each row defines the mapping of a certain number of code words ($N_{CW}$) to a certain number of spatial layers ($N_{LAYERS}$). In the examples, $d^{(q)}(n)$ denotes the n'th modulated symbol originating from code word q. $x^{(p)}(n)$ denotes the n'th complex value of the p'th spatial layer. As can be seen in the examples, in some cases the symbols of a given code word are de-multiplexed over two or more layers. In other cases, the symbols of a given code word are mapped to a single layer. The examples given herein attempt to distribute the symbols among the layers evenly, although this feature is not necessarily mandatory.

In all four examples, the mapping of code words to layers for $N_{LAYERS} \leq 4$ conforms to the mapping specified in section 6.3.3.2 of the 3GPP TS 36.211 specification, cited above. This feature maintains backward compatibility, i.e., enables the eNodeB to communicate with LTE-compliant UEs. This feature is, however, by no means mandatory. Other mapping schemes may differ from the 3GPP TS 36.211 specification as desired.

In all four examples, the maximum number of code words is two. As noted above, increasing the number of code words beyond two usually does not provide significant performance improvement. Nevertheless, in alternative embodiments, the mapping may specify higher numbers of code words, as well.

As explained above, transmitter 20 may selectably set an upper limit on the number of layers, which is less than the number of antenna ports. The transmitter may set this upper limit, for example, by storing and/or using only a subset of the rows of a given mapping table. For example, when setting $N_{MAX}=6$, the transmitter may omit the rows corresponding to $N_{LAYERS}>6$. This technique may simplify the design of layer mapper 36 and reduce the memory space used for storing the mapping table.

Additionally or alternatively, the transmitter may omit one or more of the rows of the mapping table in order to reduce memory requirements, computational complexity and signaling resources. The omitted rows do not necessarily correspond to large numbers of layers. For example, the transmitter may omit the odd-order rows or even-order rows of the mapping table.

Although the embodiments described herein mainly address setting the number of spatial layers in LTE-A transmitters, the methods and systems described herein can also be used in other applications, such as in IEEE 802.16 transceivers.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
   in a transmitter having a first number of transmit antenna ports, setting an upper limit on a second number of spatial layers to be used by the transmitter to be less than the first number;
   allocating an actual number of the spatial layers, which does not exceed the upper limit, for transmission to a given receiver;
   mapping one or more streams of modulated symbols onto the allocated actual number of the spatial layers; and
   transmitting the actual number of the spatial layers from the transmitter to the given receiver,
   wherein transmitting the spatial layers comprises applying a precoding operation that maps the spatial layers onto the transmit antenna ports, and wherein setting the upper limit comprises setting a first upper limit when the precoding operation depends on feedback from the given receiver, and setting a second upper limit, which does not exceed the first upper limit, when the precoding operation is not dependent on the feedback.

2. The method according to claim 1, and comprising encoding input data with an Error Correction Code (ECC) to produce a given number of code words, and modulating the code words to produce a respective given number of the streams of the modulated symbols, wherein the given number of the code words is restricted to be at most two.

3. The method according to claim 2, and comprising, when the actual number of spatial layers is between one and four, mapping the modulated symbols onto the spatial layers in accordance with the table shown in FIG. 4A in which $d^{(q)}(n)$ denotes an $n^{th}$ modulated symbol originating from a code word q, and $x^{(p)}(n)$ denotes an $n^{th}$ value of a spatial layer p.

4. The method according to claim 2, and comprising, when the actual number of spatial layers is between five and eight, mapping the modulated symbols onto the layers in accordance with the table shown in FIGS. 4A and 4B in which $d^{(q)}(n)$ denotes an $n^{th}$ modulated symbol originating from a code word q, and $x^{(p)}(n)$ denotes an $n^{th}$ value of a spatial layer p.

5. The method according to claim 2, and comprising, when the actual number of spatial layers is between five and eight, mapping the modulated symbols onto the layers in accordance with the table shown in FIGS. 5A and 5B in which $d^{(q)}(n)$ denotes an $n^{th}$ modulated symbol originating from a code word q, and $x^{(p)}(n)$ denotes an $n^{th}$ value of a spatial layer p.

6. The method according to claim 2, and comprising, when the actual number of spatial layers is between five and eight, mapping the modulated symbols onto the layers in accordance with the table shown in FIGS. 6A and 6B in which $d^{(q)}(n)$ denotes an $n^{th}$ modulated symbol originating from a code word q, and $x^{(p)}(n)$ denotes an $n^{th}$ value of a spatial layer p.

7. The method according to claim 2, and comprising, when the actual number of spatial layers is between five and eight, mapping the modulated symbols onto the layers in accordance with the table shown in FIGS. 7A and 7B in which $d^{(q)}(n)$ denotes an $n^{th}$ modulated symbol originating from a code word q, and $x^{(p)}(n)$ denotes an $n^{th}$ value of a spatial layer p.

8. The method according to claim 1, wherein the first number is greater than four.

9. The method according to claim 8, wherein the first number is equal to eight, and wherein the upper limit is between four and seven.

10. The method according to claim 1, wherein the spatial layers comprise respective parallel streams transmitted concurrently from the transmitter to the given receiver.

11. A method for communication, comprising:
in a transmitter having a first number of transmit antenna ports, setting an upper limit on a second number of spatial layers to be used by the transmitter to be less than the first number;
allocating an actual number of the spatial layers, which does not exceed the upper limit, for transmission to a given receiver, and signaling the actual number to the given receiver using a signaling protocol in which a data structure allocated to signaling the actual number is insufficient for signaling values higher than the upper limit;
mapping one or more streams of modulated symbols onto the allocated actual number of the spatial layers; and
transmitting the actual number of the spatial layers from the transmitter to the given receiver.

12. A method for communication, comprising:
in a transmitter having a first number of transmit antenna ports, setting an upper limit on a second number of spatial layers to be used by the transmitter to be less than the first number;
allocating an actual number of the spatial layers, which does not exceed the upper limit, for transmission to a given receiver, and signaling from the given receiver to the transmitter a preferred number of the spatial layers using a signaling protocol in which a data structure allocated to signaling the preferred number is insufficient for signaling values higher than the upper limit;
mapping one or more streams of modulated symbols onto the allocated actual number of the spatial layers; and
transmitting the actual number of the spatial layers from the transmitter to the given receiver.

13. A method for communication, comprising:
in a transmitter, which has a plurality of transmit antenna ports and is operative to map streams of modulated symbols onto spatial layers, selecting a precoding operation for use in mapping the spatial layers onto the transmit antenna ports;
setting an upper limit on a number of the spatial layers depending on the selected precoding operation;
mapping one or more of the streams of the modulated symbols onto the number of spatial layers that does not exceed the upper limit;
applying the selected precoding operation to the spatial layers so as to map the spatial layers onto the transmit antenna ports; and
transmitting the precoded spatial layers over the transmit antenna ports to a receiver,
wherein setting the upper limit comprises setting a first upper limit when the selected precoding operation depends on feedback from the receiver, and setting a second upper limit, which is less than the first upper limit, when the selected precoding operation is not dependent on the feedback.

14. The method according to claim 13, and comprising encoding input data with an Error Correction Code (ECC) to produce a given number of code words, and modulating the code words to produce the streams of the modulated symbols, wherein the given number of the code words is restricted to be at most two.

15. The method according to claim 13, wherein the spatial layers comprise respective parallel streams transmitted concurrently from the transmitter to the receiver.

16. A method for communication, comprising:
in a transmitter, which has a plurality of transmit antenna ports and is operative to map streams of modulated symbols onto spatial layers, selecting a precoding operation for use in mapping the spatial layers onto the transmit antenna ports;
setting an upper limit on a number of the spatial layers depending on the selected precoding operation;
mapping one or more of the streams of the modulated symbols onto the number of spatial layers that does not exceed the upper limit, and
applying the selected precoding operation to the spatial layers so as to map the spatial layers onto the transmit antenna ports; and
transmitting the precoded spatial layers over the transmit antenna ports to a receiver,
wherein mapping the streams onto the spatial layers comprises signaling the number of the spatial layers to the receiver using a signaling protocol in which a data structure allocated to signaling the number of the spatial layers is insufficient for signaling values higher than the upper limit.

17. A method for communication, comprising:
in a transmitter, which has a plurality of transmit antenna ports and is operative to map streams of modulated symbols onto spatial layers, selecting a precoding operation for use in mapping the spatial layers onto the transmit antenna ports;

setting an upper limit on a number of the spatial layers depending on the selected precoding operation;

mapping one or more of the streams of the modulated symbols onto the number of spatial layers that does not exceed the upper limit, and applying the selected precoding operation to the spatial layers so as to map the spatial layers onto the transmit antenna ports; and transmitting the precoded spatial layers over the transmit antenna ports to a receiver, wherein mapping the streams onto the spatial layers comprises signaling from the receiver to the transmitter a preferred number of the spatial layers using a signaling protocol in which a data structure allocated to signaling the preferred number is insufficient for signaling values higher than the upper limit.

18. A communication apparatus, comprising:
a first number of transmit antenna ports; and
a transmitter, which is configured to set an upper limit on a second number of spatial layers to be used by the transmitter to be less than the first number, to allocate an actual number of the spatial layers, which does not exceed the upper limit, for transmission to a given receiver, to map one or more streams of modulated symbols onto the allocated actual number of the spatial layers, and to transmit the actual number of the spatial layers simultaneously to the given receiver,
wherein the transmitter is configured to apply a precoding operation that maps the spatial layers onto the transmit antenna ports, to set the upper limit by setting a first upper limit when the precoding operation depends on feedback from the given receiver and by setting a second upper limit, which does not exceed the first upper limit, when the precoding operation is not dependent on the feedback.

19. The apparatus according to claim 18, wherein the transmitter is configured to encode input data with an Error Correction Code (ECC) to produce a given number of code words, and to modulate the code words to produce the respective given number of the streams of the modulated symbols, wherein the given number of the code words is restricted to be at most two.

20. The apparatus according to claim 18, wherein the first number is greater than four.

21. The apparatus according to claim 20, wherein the first number is equal to eight, and wherein the upper limit is between four and seven.

22. The apparatus according to claim 18, wherein the spatial layers comprise respective parallel streams transmitted concurrently from the transmitter to the given receiver.

23. The apparatus according to claim 18, wherein the transmitter is comprised in a mobile communication terminal.

24. The apparatus according to claim 18, wherein the transmitter is comprised in a base station.

25. A communication apparatus, comprising:
a first number of transmit antenna ports; and
a transmitter, which is configured to set an upper limit on a second number of spatial layers to be used by the transmitter to be less than the first number, to allocate an actual number of the spatial layers, which does not exceed the upper limit, for transmission to a given receiver, to signal the actual number to the given receiver using a signaling protocol in which a data structure allocated to signaling the actual number is insufficient for signaling values higher than the upper limit, to map one or more streams of modulated symbols onto the allocated actual number of the spatial layers, and to transmit the actual number of the spatial layers simultaneously to the given receiver.

26. A communication apparatus, comprising:
a first number of transmit antenna ports; and
a transmitter, which is configured to set an upper limit on a second number of spatial layers to be used by the transmitter to be less than the first number, to allocate an actual number of the spatial layers, which does not exceed the upper limit, for transmission to a given receiver, to receive from the given receiver an indication of a preferred number of the spatial layers using a signaling protocol in which a data structure allocated to signaling the preferred number is insufficient for signaling values higher than the upper limit, to map one or more streams of modulated symbols onto the allocated actual number of the spatial layers, and to transmit the actual number of the spatial layers simultaneously to the given receiver.

27. A communication apparatus, comprising:
a first number of transmit antenna ports; and
a transmitter, which is configured to map streams of modulated symbols onto spatial layers, to select a precoding operation for use in mapping the spatial layers onto the transmit antenna ports, to set an upper limit on a number of the spatial layers depending on the selected precoding operation, to map one or more of the streams of the modulated symbols onto the number of spatial layers that does not exceed the upper limit, to apply the selected precoding operation to the spatial layers so as to map the spatial layers onto the transmit antenna ports, and to transmit the precoded spatial layers over the transmit antenna ports to a receiver,
wherein the transmitter is configured to set the upper limit by setting a first upper limit when the precoding operation depends on feedback from the receiver, and by setting a second upper limit, which is less than the first upper limit, when the precoding operation is not dependent on the feedback.

28. The apparatus according to claim 27, wherein the transmitter is configured to encode input data with an Error Correction Code (ECC) to produce a given number of code words, and to modulate the code words to produce the one or more streams of the modulated symbols, wherein the given number of the code words is restricted to be at most two.

29. The apparatus according to claim 27, wherein the spatial layers comprise respective parallel streams transmitted concurrently from the transmitter to the receiver.

30. The apparatus according to claim 27, wherein the transmitter is comprised in a mobile communication terminal.

31. The apparatus according to claim 27, wherein the transmitter is comprised in a base station.

32. A communication apparatus, comprising:
a first number of transmit antenna ports; and
a transmitter, which is configured to map streams of modulated symbols onto spatial layers, to select a precoding operation for use in mapping the spatial layers onto the transmit antenna ports, to set an upper limit on a number of the spatial layers depending on the selected precoding operation, to map one or more of the streams of the modulated symbols onto the number of spatial layers that does not exceed the upper limit, to apply the selected precoding operation to the spatial layers so as to map the spatial layers onto the transmit antenna ports, to transmit the precoded spatial layers over the transmit antenna ports to a receiver, and to signal the number of the spatial layers to the receiver using a signaling protocol in which a data structure allocated to signaling the number of the spatial layers is insufficient for signaling values higher than the upper limit.

33. A communication apparatus, comprising:

a first number of transmit antenna ports; and a transmitter, which is configured to map streams of modulated symbols onto spatial layers, to select a precoding operation for use in mapping the spatial layers onto the transmit antenna ports, to set an upper limit on a number of the spatial layers depending on the selected precoding operation, to map one or more of the streams of the modulated symbols onto the number of spatial layers that does not exceed the upper limit, to apply the selected precoding operation to the spatial layers so as to map the spatial layers onto the transmit antenna ports, to transmit the precoded spatial layers over the transmit antenna ports to a receiver, and to receive from the receiver an indication of a preferred number of the spatial layers using a signaling protocol in which a data structure allocated to signaling the preferred number is insufficient for signaling values higher than the upper limit.

* * * * *